March 14, 1933.  L. P. STRONG  1,901,200
STEAM TRAP
Filed March 16, 1932
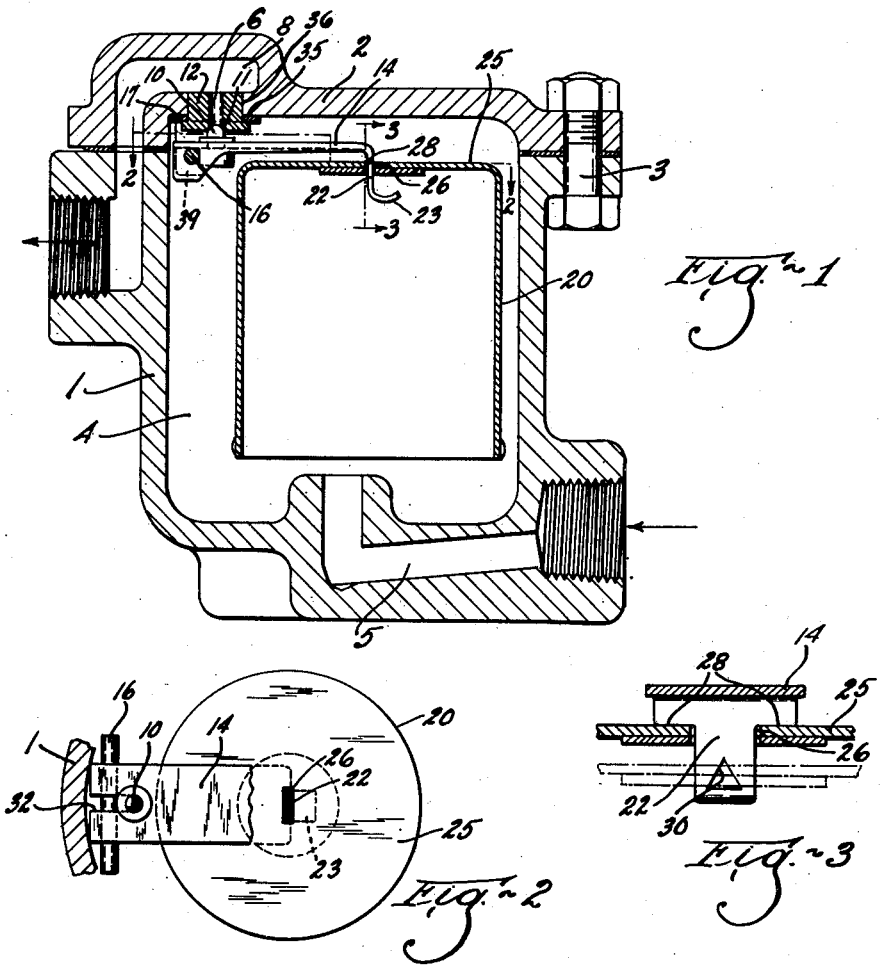
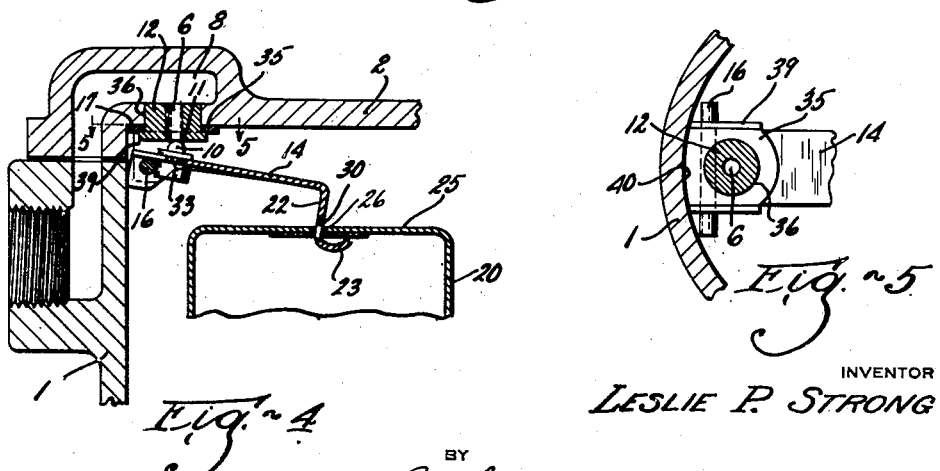
INVENTOR
LESLIE P. STRONG
BY
Brockett, Hyde, Higley & Meyer
ATTORNEYS Patented Mar. 14, 1933

1,901,200

UNITED STATES PATENT OFFICE

LESLIE P. STRONG, OF LAKEWOOD, OHIO, ASSIGNOR TO THE CLARK MANUFACTURING COMPANY, OF CLEVELAND, OHIO, A CORPORATION OF OHIO

STEAM TRAP

Application filed March 16, 1932. Serial No. 599,116.

This invention relates to improvements in steam traps of the inverted bucket type.

One of the objects of the present invention is the provision of an improved steam trap of the type specified, said trap having simple yet quite effective means for automatically preventing the air vent opening in the top wall of the inverted trap bucket from being rendered ineffective by becoming plugged or clogged, such as with impurities entering the trap chamber through the trap inlet.

A further object of the present invention is the provision of an inverted bucket type steam trap which can be easily and simply provided with improved means for automatically increasing, when the trap bucket starts to fall within the trap chamber, the size, and hence the effectiveness, of the air vent means of said bucket. By so doing, the present trap can be caused to operate intermittently, a very desirable type of steam trap operation.

A further object of the present invention is the provision of an inverted bucket type steam trap having simple and improved means for maintaining in assembled relation to the trap outlet valve and its operating lever, said trap also having simple and improved means for maintaining in proper position the supporting bracket for said lever.

Further objects of the present invention are in part obvious and in part will appear more in detail hereinafter.

The present invention will be more readily understood from the following description of one embodiment thereof, reference being had to the accompanying drawing in which Fig. 1 is a vertical sectional view of a steam trap embodying the present invention; Fig. 2 is a detail cross-sectional view thereof on the line 2—2, Fig. 1; Fig. 3 is a detail vertical sectional view thereof on the line 3—3, Fig. 1; Fig. 4 is a fragmentary vertical sectional view of the present trap, with the bucket thereof in its lowermost position; and Fig. 5 is a detail cross sectional view thereof on the line 5—5, Fig. 4.

The steam trap here illustrated includes a metal casing 1 of the usual cylindrical shape, said casing being closed at its top by a generally circular metal cover 2, bolted at 3, or otherwise suitably secured to the top of said casing. Within said casing is a generally cylindrical chamber 4 into which enters through the trap inlet 5, at the bottom of the casing, water, steam and air from the steam line or the like with which the trap is in communication.

The purpose of the present trap is, of course, to remove water and air from the steam line or the like to which it is connected, and water and air entering the chamber 4 of the present trap are discharged therefrom through the trap outlet 6, the mouth or entrance 8 of which is in the casing cover 2.

For controlling said outlet, a valve 10 is provided, said valve being of ball-like form and cooperating with the valve seat 11 of a removable valve seat member 12, said valve seat member being driven into or otherwise suitably secured in the mouth or entrance 8 of the trap outlet 6. For operating said valve, a generally horizontally disposed lever 14 is provided, said lever having one of its ends mounted at 16 in a bracket 17 carried by the trap cover 2. The valve 10 is carried by this pivoted end of its operating lever 14, said valve being maintained in proper assembled relation with said lever by means of the pin 16 on which said lever is pivoted, as will later appear. The other and free end of the valve operating lever 14 is suitably connected to and supports the inverted bucket 20 of the present trap, said bucket being arranged, of course, within the trap chamber 4.

As clearly shown in the accompanying drawing, the free end of the valve operating lever 14 is made up of or comprises a depending, generally vertically disposed part 22 terminating in a generally horizontally disposed and generally U-shaped part 23, these two parts 22, 23 giving the free end of this valve operating lever a sort of hook shape. On this hook-shaped lever end is loosely hung the inverted bucket 20, the circular top wall 25 of said bucket being provided at substantially its center with a generally rectangular slot 26 for receiving said hook-shaped lever end. As best shown in Fig. 2, the slot 26 is greater in cross dimensions than that of the depending lever part 22 which lies within said slot, so that a portion of said slot is always available to serve as a limited air vent for the trap bucket 20. It is, of course, necessary that the normal air vent of an inverted steam trap bucket be quite small, and the portion of the slot 26 which here constitutes the normal air vent of the present bucket is of such a limited size.

When the trap bucket 20 contains sufficient steam, said bucket is held in its fully raised position, as shown in Fig. 1. In this position, its top wall 25 lies at substantially the upper end of the vertically disposed part 22 of the valve operating lever 14, forward movement of said bucket top wall along said lever part being limited by the shoulders 28 with which said lever part is provided as the result of reducing in width the lower portion thereof.

When a sufficient amount of water is collected in the trap chamber 4, the trap bucket 20 loses its buoyancy and starts to fall, the first portion of the fall of said bucket being along the depending lever part 22. Further falling of said bucket causes its top wall 25 to strike the generally horizontally disposed end part 23 of the valve operating lever 14, with consequent rocking of said lever in a counter-clockwise direction about its pivot 16 and consequent opening of the outlet valve 10. Fig. 4 shows the trap bucket 20 in its fully lowered position, the top wall 25 of said bucket resting upon the horizontally disposed lever end part 23. Due to the longitudinal curvature or U-shape of this lever part 23, there is no liability of the bucket slot 26 from being completely closed thereby, as will be readily understood.

The vertical movement of the trap 20 along the vertically disposed lever part 22 effectively prevents any clogging of the bucket slot 26 through which said lever part extends. A portion of said slot is, therefore, available at all times as an air vent for the trap bucket, and even though said portion is relatively small, as it must be, oil, dirt and the like entering the trap chamber 4 through the trap inlet 5 is prevented from clogging said portion and thereby rendering ineffective the normal air vent of the trap bucket.

With an intermittent type of steam trap operation, the trap outlet valve is opened less frequently, but inasmuch as such opening is a complete one and of appreciable duration, due to the complete falling of the trap bucket in the trap chamber, the amount of each trap discharge is greater. There is, therefore, no need for frequent discharge by the trap.

In order to cause the present steam trap to operate intermittently, it is only necessary to increase the size, and hence the effectiveness, of the air vent means of the trap bucket as said bucket starts to fall. By so doing, the bucket almost immediately loses its buoyancy to such an extent that it continues to fall to its lowermost position.

In the present embodiment of the invention, intermittent trap operation is effected by making the lower portion of the depending lever part 22 of decreasing cross-sectional extent or area, such as by providing in said portion an opening 30 of increasing width from top to bottom, said opening being here shown as triangular. Therefore, when the trap bucket starts to fall along this depending lever part 22, the opening 30 in said lever part is exposed, more and more of said opening being exposed as the trap falls lower and lower along said lever part. The result is to increase, as said bucket falls in the trap chamber 4, the size, and hence the effectiveness, of the vent means of said bucket. The buoyancy of the bucket is, therefore, quickly overcome when said bucket starts to fall, so that said bucket falls its maximum extent, with complete opening of the trap outlet valve 10 and an appreciable discharge of water from the trap chamber.

As best shown in Fig. 2, the pivoted end portion of the valve operating lever 14 is provided with a longitudinally disposed end slot 32, into which is slid the outlet valve 10, said valve being provided intermediate its ends with a reduced portion 33 for this purpose. When the transversely disposed pivot pin 16 for said valve operating lever is in position, as shown in the drawing, the mouth or entrance of the lever slot 32 is not only effectively closed by said pin but also, said pin firmly engages the lower end of said valve. Said valve is therefore securely maintained in proper position at the inner end of said lever slot.

As before mentioned, the pivot pin 16 for the valve lever 14 is mounted in a bracket 17 carried by the casing cover 2. This bracket 17 is secured to said cover by means of the removable valve seat member 12 which itself is secured to said cover. As best shown in Fig. 5, the top portion 35 of the bracket 17 is provided with an opening 36 through which extends the valve seat member 12, said valve seat member being provided at its lower end with an outwardly extending annular confining flange 37 lying below said bracket top wall and thereby maintaining said bracket in assembled relation with the cover 2. Depending from the top wall 35 of this bracket 17, at the two sides thereof, are two arms 39, in which is mounted the pivot pin 16 for the valve operating lever 14.

In order to prevent the bracket 17 from any rotary shifting, with consequent improper positioning of the trap bucket 20 in the trap chamber 4, the outer edge 40 of the top wall 35 of said bracket, (which edge engages the inner surface of the annular side wall of the trap casing 1) is given a curvature corresponding to that of the inner surface of said casing side wall. As a result, there is no liability of this lever supporting bracket 17 shifting its position, as will be readily understood.

What I claim is:

1. A steam trap, comprising a chambered casing having an inlet and an outlet, valve means for controlling said outlet, a vertically movable inverted bucket in the chamber of said casing, said bucket being provided in its top wall with an air vent opening, and means connecting said bucket and said valve means so as to effect operation of said valve means by vertical movement of said bucket in said chamber, said connecting means being associated with said air vent opening and being adapted to prevent said opening from becoming clogged, such as with impurities entering said chamber through said inlet.

2. A steam trap, comprising a chambered casing having an inlet and an outlet, a valve for said outlet, a valve operating member having one of its end portions connected to said valve, and a vertically movable inverted bucket in the chamber of said casing and provided in its top wall with an opening through which extends the free end portion of said valve operating member, said opening being of such size as to at all times constitute an air vent for said bucket.

3. A steam trap, comprising a chambered casing having an inlet and an outlet, a valve for said outlet, a valve operating member having one of its end portions connected to said valve, and a vertically movable inverted bucket loosely mounted on the other end portion of said operating member by means of an opening in the top wall of said bucket, said opening being of sufficient size to at all times provide an air vent for said bucket, the construction being such that the vertical movement of said bucket in said chamber not only effects operation of said valve but also prevents said opening from being clogged, such as with impurities entering said chamber through said inlet.

4. A steam trap, comprising a chambered casing having an inlet and an outlet, a valve for said outlet, a vertically movable inverted bucket in the chamber of said casing and provided in its top wall with an air vent opening, a pivotally mounted valve operating member in said chamber having one of its end portions connected to said valve and the other of its end portions loosely connected to said bucket, the construction being such that vertical movement of said bucket in said chamber effects operation of said valve, said last mentioned end portion of said valve operating member having a depending part extending through but not completely closing the air vent opening of said bucket, whereby said opening is prevented by said depending part from becoming clogged, such as with impurities entering said chamber through said inlet.

5. A steam trap, comprising a chambered casing having an inlet and an outlet, a valve for said outlet, an inverted bucket in the chamber of said casing and provided in its top wall with an air vent opening, a valve operating member in said chamber having one of its end portions connected to said valve, said bucket being connected to the other end portion of said valve operating member, said last mentioned end portion having a depending part extending through but not completely closing said bucket vent opening, said bucket having vertical movement in said chamber relative to said depending part, whereby said bucket vent opening is prevented by said part from becoming clogged, such as with impurities entering said chamber through said inlet.

6. A steam trap, comprising a chambered casing having an inlet and an outlet, a valve for said outlet, a valve operating member in the chamber of said casing and having an operating end portion connected to said valve and also having a depending hooked shaped supporting portion, and a vertically movable inverted bucket in said chamber and loosely mounted on the hooked shaped end portion of said operating member by means of an opening through which extends a part of said hooked shaped portion, said opening being larger than said part, whereby an air vent for said bucket is always provided by said opening.

7. A steam trap, comprising a chambered casing having an inlet and an outlet, a valve for said outlet, a pivotally mounted valve operating member in the chamber of said casing and having a generally vertical part arranged between two generally horizontal parts, a vertically movable inverted bucket in said chamber loosely mounted on the vertically disposed part of said valve operating member by means of an opening in the top wall of said bucket through which said part extends, said bucket opening being larger than said part, whereby an air vent for said bucket is at all times provided by said opening.

8. A steam trap, comprising a chambered casing having an inlet and an outlet, a valve for said outlet, an inverted bucket in the chamber of said casing and adapted for vertical movement between a fully raised position and a fully lowered position, said bucket being provided in its top wall with an air vent, a pivotally mounted valve operating member in said chamber connected to said valve and said bucket, whereby vertical movement of said bucket in said chamber effects operation of said valve, and means for increasing the size of said bucket air vent as said bucket moves from its fully raised position toward its fully lowered position, said means comprising an opening in said valve operating member.

9. A steam trap, comprising a chambered casing having an inlet and an outlet, a valve for said outlet, an inverted bucket in the chamber of said casing and adapted for vertical movement between a fully raised position and a fully lowered position, said bucket being provided in its top wall with an air vent, a pivotally mounted valve operating member in said chamber connected to said valve and said bucket, whereby vertical movement of said bucket in said chamber effects operation of said valve, and means for increasing the size of said bucket air vent as said bucket moves from its fully raised position toward its fully lowered position, said means comprising an opening in said valve operating member, said opening being of increasing width from top to bottom.

10. A steam trap, comprising a chambered casing having an inlet and an outlet, a valve for said outlet, an inverted bucket in the chamber of said casing and adapted for vertical movement between a fully raised position and a fully lowered position, said bucket being provided in its top wall with an air vent, a pivotally mounted valve operating member in said chamber and having an operating end portion connected to said valve and also having a supporting end portion connected to said bucket, whereby vertical movement of said bucket in said chamber effects operation of said valve, said supporting end portion of said valve operating member having a part extending through said bucket air vent, said bucket having vertical movement along said part and said part being provided with an opening in its lower end portion, whereby air venting of said bucket is increased as said bucket moves from its fully raised position to its fully lowered position.

11. A steam trap, comprising a chambered casing having an inlet and an outlet, a valve for said outlet, an inverted bucket in the chamber of said casing and adapted for vertical movement between a fully raised position and a fully lowered position, said bucket being provided in its top wall with an air vent, a pivotally mounted valve operating member in said chamber and having an operating end portion connected to said valve and also having a supporting end portion connected to said bucket, whereby vertical movement of said bucket in said chamber effects operation of said valve, said supporting end portion of said valve operating member having a part extending through said bucket air vent, said bucket having vertical movement along said part and said part being provided with a vertically disposed opening of increased width from top to bottom, whereby the air venting of said bucket is increased as said bucket moves from its fully raised position to its fully lowered position.

12. In a steam trap, a casing having an outlet, a valve for said outlet, a valve operating member having a slotted end portion, said valve being arranged in said slot, and a pivot pin for said valve operating member so located as to engage said valve and close the mouth of said slot, whereby said valve is maintained in said slot and thus in assembled relation with said valve operating member.

13. A steam trap, comprising a chambered casing having an inlet and an outlet, a valve for said outlet, an inverted bucket in the chamber of said casing and adapted for vertical movement therein between a fully raised position and a fully lowered position, said bucket being provided in its top wall with an air vent, and pivotally mounted valve operating means in said chamber connected to said valve and said bucket, whereby vertical movement of said bucket in said chamber effects operation of said valve, said valve operating means having a part extending through said bucket air vent, said part being so constructed and arranged that the size of said bucket air vent is increased as said bucket moves from its fully raised position to its fully lowered position.

14. A steam trap, comprising a chambered casing having an inlet and an outlet, a valve for said outlet, an inverted bucket in the chamber of said casing and adapted for vertical movement therein between a fully raised position and a fully lowered position, said bucket being provided in its top wall with an air vent, and pivotally mounted valve operating means in said chamber connected to said valve and said bucket, whereby vertical movement of said bucket in said chamber effects operation of said valve, said valve operating means having a part extending through said bucket air vent, said part being of such cross-sectional area or extent that the size of said bucket air vent is increased as said bucket moves from its fully raised position to its fully lowered position.

15. A steam trap, comprising a chambered casing having an inlet and an outlet, a valve for said outlet, an inverted bucket in the chamber of said casing and adapted for vertical movement therein between a fully raised position and a fully lowered position, said bucket being provided in its top wall with an air vent, and pivotally mounted valve operating means in said chamber connected to said valve and said bucket, whereby vertical movement of said bucket in said chamber effects operation of said valve, said valve operating means having a part extending through said bucket air vent, the lower end portion of said part being of decreasing cross-sectional area or extent from top to bottom, whereby the size of said bucket air vent is of increasing character as said bucket moves from its fully raised position to its fully lowered position.

In testimony whereof I hereby affix my signature.

LESLIE P. STRONG.